United States Patent [19]

Hutchinson

[11] 3,938,023

[45] Feb. 10, 1976

[54] VOLTAGE MONITOR AND CONTROL CIRCUIT

[75] Inventor: Homer F. Hutchinson, Wheaton, Ill.

[73] Assignee: GTE Automatic Electric Laboratories Incorporated, Northlake, Ill.

[22] Filed: Sept. 27, 1974

[21] Appl. No.: 509,751

[52] U.S. Cl. ............... 321/2; 321/18; 307/235 R
[51] Int. Cl.² ................................. H02M 3/335
[58] Field of Search ...... 321/2, 18; 331/109, 113 A; 317/DIG. 5; 323/17; 307/235 R

[56] References Cited
UNITED STATES PATENTS

| | | |
|---|---|---|
| 2,963,637 | 12/1960 | Osborn .................... 317/DIG. 5 |
| 3,192,464 | 6/1965 | Johnson et al. .................... 321/2 |
| 3,202,902 | 8/1965 | Glass ............................ 321/2 |
| 3,327,199 | 6/1967 | Gardner et al. ................. 321/18 |
| 3,532,961 | 10/1970 | Bramer ........................ 321/18 |
| 3,748,536 | 7/1973 | Andressen .................... 321/14 |

*Primary Examiner*—William M. Shoop
*Attorney, Agent, or Firm*—David W. Heid

[57] ABSTRACT

A circuit for the monitoring and control of a DC to DC regulated power supply furnishing regulated voltage to a load. The output of the power converter is ultimately used to control a pair of shunting transistors which control the switching transistors in the power converter.

7 Claims, 1 Drawing Figure

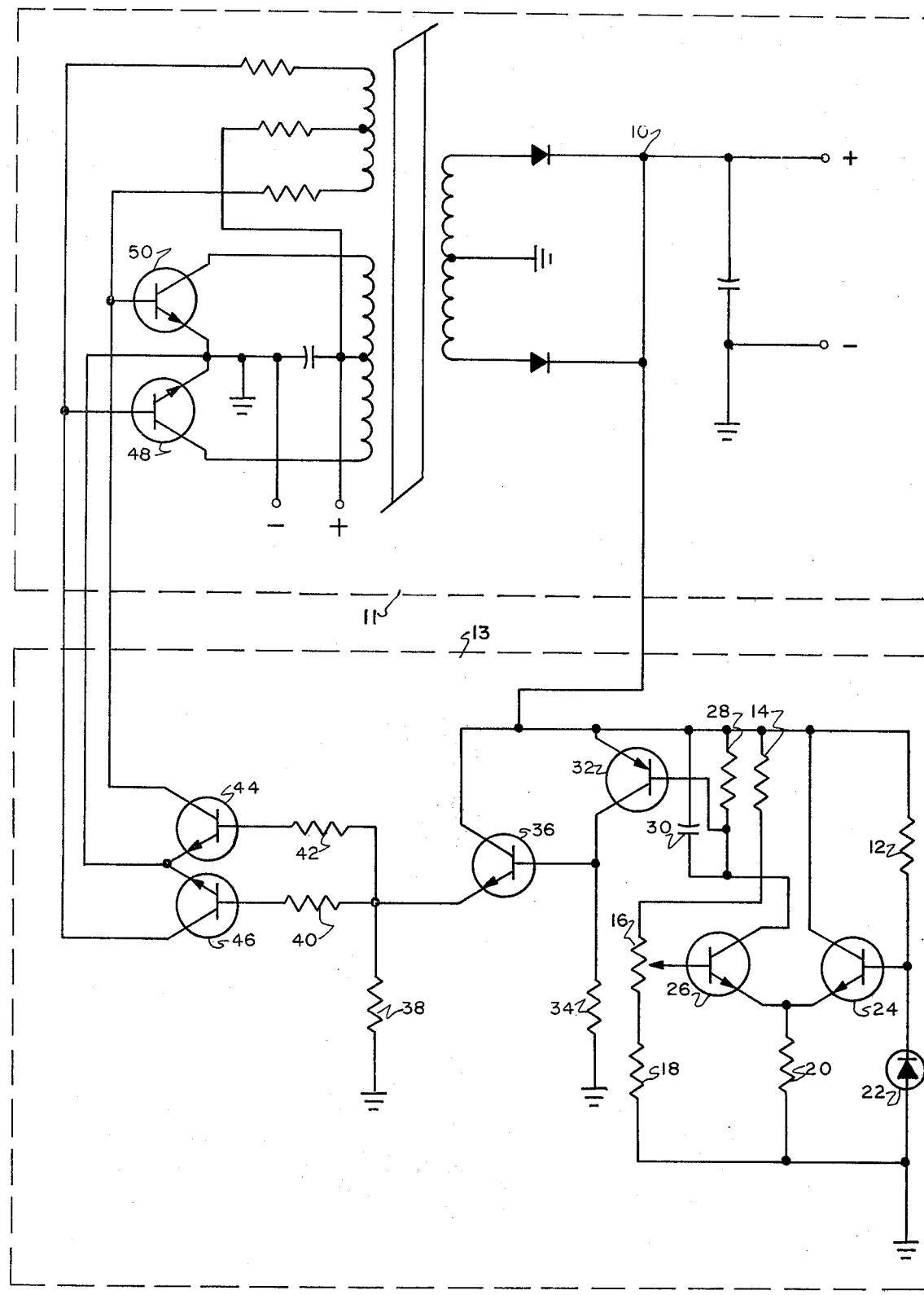

VOLTAGE MONITOR AND CONTROL CIRCUIT

BACKGROUND OF THE INVENTION

1. Field of the Invention

This invention relates to power supplies and more particularly to a circuit for the monitoring and control of a power supply furnishing precision regulated voltage to a load.

2. Description of the Prior Art

A free running DC to DC converter is a highly efficient and economical way of converting voltage from one potential level to another potential level. However, a major disadvantage of a free running converter is its poor inherent voltage regulation characteristics. With the continuing growth and complexity of telephone switching systems, the supporting power supply systems have been called upon to furnish a precision regulated voltage with only minor deviations from one potential level to another. Further the power supplies in such systems are required to retain their very high reliability and overload safety characteristics as those in the past while at the same time retaining some degree of efficiency.

The disadvantage of the poor inherent regulation may be readily corrected by inserting a series regulator between the converter output and the load. This solution, however, requires a separate circuit package which dissipates part of the converter's power output and reduces the efficiency.

Another method of regulation is disclosed by a French Pat. No. 1,492,611. A two transistor push-pull oscillator with a transformer and a zener diode voltage reference was used to drive a control transistor, which is in series with a common lead between the feedback winding centertap and the emitters of both oscillator transistors. Regulation is effected by turning the control transistor on to saturation in order to get the highest output voltage on one extreme and by turning the control transistor off to obtain no output voltage on the other extreme. The disadvantage of this circuit occurs during this "other extreme," for it is possible that the leakage current, output capacitance and stray capacitance of the circuit involving the "off" transistor may prevent turning off the "on" transistor.

Another means of effecting regulation was disclosed by U.S. Pat. No. 3,327,199 which issued to Gardner et al on June 20, 1967. Regulation is provided by varying the input voltage to a basic one transformer converter circuit.

Another method providing regulation for a DC to DC converter was disclosed by U.S. Pat. No. 3,427,525 which issued to Thornwall on Feb. 11, 1969. Thornwall achieves regulation by using a switching means to alternately clamp and release a transformer couple regenerative blocking oscillator. The clamping and releasing rates are determined by the relative magnitude of the input and output voltages and by the power required by the load.

OBJECTS AND SUMMARY OF THE INVENTION

From the foregoing discussion it will be understood that among the various objectives of the present invention are:

To provide a voltage monitor and control circuit capable of use with a push-pull oscillator converter giving positive control of each of the two oscillator transistors;

To provide a voltage monitor and control circuit capable of use in a push-pull oscillator converter utilizing a square loop type core and retaining its overload safety characteristics and reliability.

To provide a voltage monitor circuit used in a push-pull oscillator converter with a control circuit which is not affected by any leakage or capacitive currents passing through the transistors of the oscillator circuit.

These and other objectives of the present invention are efficiently achieved by providing a voltage monitor and control circuit to which the positive DC power source is fed. A voltage reference is provided by a zener diode connected to a differential amplifier. The differential amplifier consists of dual transistors having common emitter connections with one base connected to the zener diode and the other base connected to a voltage divider across the output voltage of the power supply. Should the voltage at the base of the second transistor exceed that of the base of the first transistor as determined by the zener diode, the first transistor is pulled into conduction thereby providing a load or a sink for a third transistor also connected to the positive DC power source. The third transistor then in turn provides a conductive path for a fourth transistor which turns on a dual arrangement of two transistors providing a shunting or clamping effect on the switching transistors contained in the DC power converter. When this occurs the switching transistors cease operation in the saturated mode thereby causing a voltage drop across the oscillator transistors causing the output voltage to drop to the regulated voltage level.

The level at which the second transistor or the differential amplifier comes into conduction is in part determined by the potentiometer adjustment attached to its base from the voltage dividing network connected between the current supply line and ground.

The foregoing as well as other objects, features and advantages of the present invention will become more apparent from the following detailed description taken in conjunction with the appended drawings.

BRIEF DESCRIPTION OF THE DRAWING

The single appended FIGURE is a schematic diagram of the voltage monitor and control circuit in accordance with the present invention.

DESCRIPTION OF THE PREFERRED EMBODIMENT

With reference now to the FIGURE there is shown a typical DC power converter 11 comprising a square loop core with a primary, secondary and feedback windings and a pair of switching transistors.

The monitor and control circuit 13 senses the positive output from the converter at point 10. This voltage is applied across resistor 12 and zener diode 22 serving as a reference source, connected in series. The voltage also appears across resistor 14, potentiometer 16 and resistor 18 serving as a sensing device, also connected in series. Transistors 24 and 26 function as a differential amplifier such that at a level determined by the adjustment of the potentiometer 16, the voltage at the base of transistor 26 reaches a predetermined level, a level higher than the base of transistor 24, at which point transistor 26 will be in conduction forming a current path starting at terminal 10 through transistor 32 emitter to base junction and through the collector and emitter of transistor 26 and passing through resistor 20 to ground. This switches transistor 32 on with the current flowing through its emitter to collector and transistor 36 base to emitter. Transistor 36 now being in conduction the current passes through current limiting resistors 40 and 42 and through the shunting transistors 44 and 46 base to emitter and finally to the switching transistors 48 and 50 contained within the converter, thereby shunting the base emitter junction of the transistors such that the output of the converter drops. Leakage resistors 28, 34 and 38 are provided and a frequency compensator capacitor 30 prevents spurious oscillations occurring within the circuit. The frequency compensator capacitor 30 and transistors 32 and 36 form a translating device.

From the foregoing it will be seen that Applicant has provided an improvement in voltage monitor and control circuits whereby the objectives set forth hereinabove are effectively met. Certain changes in the above described construction will appear to those skilled in the art without departure from the scope of the invention, it is intended that all matter contained in the preceding description or shown in the appended drawing shall be interpreted as illustrative and not in a limiting sense.

Having described what is new and novel and desired to secure by Letters Patent, What is claimed is:

1. A voltage monitoring control circuit connected to a DC to DC power converter utilizing switching transistors connected to a primary winding and a feedback winding of a transformer having a secondary winding whose output is rectified and forms the output of the power converter, wherein said voltage monitoring control circuit comprises:
   a differential amplifier;
   voltage reference means connected to one input of said differential amplifier;
   sensing means connected between said power converter output and said second input of said differential amplifier, said differential amplifier producing an output in response to voltage changes at said second input proportional in magnitude to said voltage changes;
   shunting control means connected to said switching transistors of said power counverter, said shunting means including a control transistor connected across each of said switching transistors, the main current path of said control transistors connected across the base emitter junction of said respective switching transistors; and
   translating means connected between said control leads of said junction control transistors and said output of said differential amplifier, said shunting control transistors controlling the base current of said switching transistors so as to regulate the output of said power converter.

2. A voltage monitor and control circuit as claimed in claim 1 wherein:
   said translating means comprises a first and second transistor, said first transistor connected to said differential amplifier, said second transistor connected to said first transistor and to said shunting means.

3. A voltage monitor and control circuit as claimed in claim 1 further comprising:
   a frequency compensator means, said frequency compensator means connected between said differential amplifier and said power supply output, to prevent current leakage and acting as a filter to prevent spurious oscillations within the circuit.

4. A voltage monitor and control circuit as claimed in claim 3 wherein said frequency compensator means comprises a capacitor.

5. A voltage monitor and control circuit as claimed in claim 1 wherein:
   said differential amplifier comprises a plurality of transistors, a first one of said transistors connected to said reference means and a second of said transistors connected to said sensing means.

6. A voltage monitor and control circuit as claimed in claim 1 further including:
   a leakage means, wherein said means comprises a grounding resistor connected to the base terminal of said shunting means and said translating means.

7. A voltage monitor and control circuit as claimed in claim 1 wherein said voltage reference means comprises a zener diode.

* * * * *